May 30, 1944. L. W. GREVE 2,349,957
SHOCK ABSORBING STRUT
Filed Nov. 12, 1941
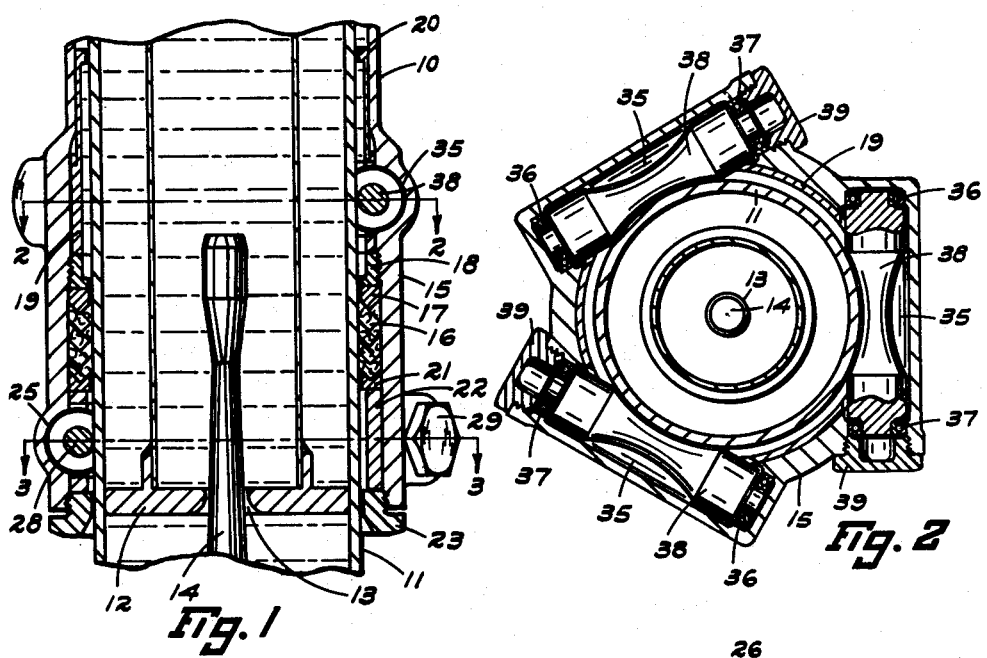
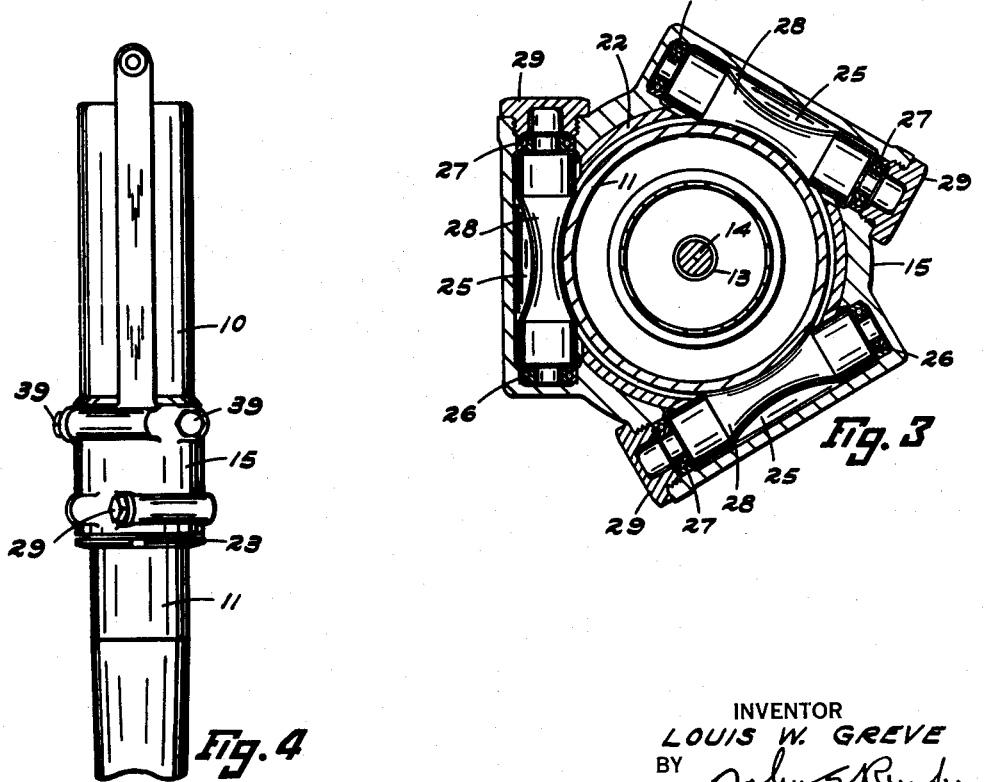
INVENTOR
LOUIS W. GREVE
BY
ATTORNEY Patented May 30, 1944

2,349,957

UNITED STATES PATENT OFFICE 2,349,957

SHOCK-ABSORBING STRUT

Louis W. Greve, Cleveland, Ohio, assignor to The Cleveland Pneumatic Tool Company, Cleveland, Ohio, a corporation of Ohio Application November 12, 1941, Serial No. 418,690

11 Claims. (Cl. 308—6)

This invention relates to improvements in air struts, and has reference particularly to the provision of anti-friction bearings between the telescoping cylindrical members of a strut. In the interest of safety, it is highly important that the cylinders of an air strut be free at all times to move upon each other, particularly when the strut is used upon a retractible running gear. Should the cylinders jam and the retracting mechanism be disabled because of that fact, a bad accident might occur when the plane landed.

The primary object of the present invention, therefore, is to make jamming of the telescoping cylinders a practical impossibility.

Another object is the provision of roller mechanism designed to cut down friction between the cylinders to an irreducible minimum.

Another object is the provision of mechanism of this character which may be readily assembled in the strut, readily lubricated, and readily serviced otherwise.

Other objects and features of novelty will appear as I proceed with the description of that embodiment of the invention which, for the purposes of the present application, I have illustrated in the accompanying drawing in which:

Fig. 1 is a fragmental, central, longitudinal, sectional view of an airplane strut embodying the invention;

Figs. 2 and 3 are transverse sectional views taken substantially on the lines 2—2 and 3—3 of Fig. 1; and Fig. 4 is an elevational view of a portion of a strut on a smaller scale.

In the drawing 10 represents the outer cylinder and 11 the inner cylinder of a pair of telescoping cylinders constituting the principal operating elements of a hydro-pneumatic shock absorber or strut designed for use upon airplanes. The part 12 is a piston which moves with the outer cylinder 10 and has a central aperture 13 through which projects a metering pin 14 that moves with the inner cylinder. These parts 12 and 14 are conventional and need no description, and are illustrated merely incidentally as they have no bearing upon the present invention.

The cylinder 10 at its lower end has an enlargement 15 of greater internal, as well as external, diameter as compared with the major portion of the cylinder. This enlargement houses the usual annular packing 16. Above the latter, as seen in Fig. 1, there is a metal ring 17 which seats against a ring 18 that is threaded into the cylinder 10. Above the ring 18 there is a sleeve 19, a portion of which extends up into the main part of cylinder 10 and has a thickened upper rim 20 which may form a stop to limit the degree to which the strut may be extended on its expansion stroke.

Below packing 16 there is a metal ring 21 which confines the lower edge of the packing. This ring rests upon the upper edge of a relatively wide metal ring 22 which in turn bears upon an adjusting ring 23 that is threadably mounted in the lower extremity of the enlargement 15. As the ring 23 is threaded inwardly or upwardly, it exerts pressure through rings 22 and 21 to compress the packing 16, this being a more or less conventional arrangement.

In accordance with the present invention, two sets or series of rollers spaced apart lengthwise of the strut are mounted in the outer cylinder 10, the rollers of each set having a longitudinal contour corresponding with the transverse contour of the cylinder surface with which they engage. In a broader aspect of the invention, a single set of such rollers may be employed, but two sets spaced apart more or less will produce the best results. In fact, more than two sets may in some instances be deemed desirable.

I have found that where two sets are employed, a desirable location for them is upon opposite sides of the packing, preferably cutting or intercepting the packing ring 22 and the sleeve 19, as illustrated in the drawing. Three rollers are shown in each set and this is the number which I prefer to employ, but obviously two rollers or more than three rollers may be used more or less successfully.

The enlargement 15 at the lower end of cylinder 10 may be formed to provide three approximately cylindrical pockets 25 arranged in a transverse plane and spaced at equal intervals, that is, 120° apart. One end only of each pocket is open, and at both ends appropriate surfaces are machined to take ball bearings 26 and 27. These bearings rotatably support trunnions on the ends of rollers 28, the largest diameter of each roller being somewhat less than the outer diameter of the ball bearing 26 in order that the roller with the bearings assembled thereupon may be inserted into the pocket 25 through the open end of the latter when the parts are assembled. The ring 22 has three windows cut therein to receive the rollers, it being understood that the ring is put into position before the rollers are inserted, and of course, before the inner cylinder 11 is inserted into the outer cylinder 10. After the rollers are in place, the open ends of the pockets are closed by threaded plugs 29, which in addition to preventing leakage, engage the outer races of the ball bearings 27 to thereby hold the rollers against axial movement. The central part of each roller, being the part which engages the cylinder 11, is formed to the same curvature as the outer surface of that cylinder. In other words, the surface is a concave one with the narrowest diameter at the middle. For lack of a better term, these rollers will be referred to hereinafter as "spool-like" rollers. While there must necessarily be a little slippage along the contacting surfaces owing to the difference in diameter between the center and the ends of the spool, this is obviously of no importance, particularly inasmuch as the rate of movement of the parts is slow. Lubrication of the rollers may be effected at the necessary times by the removal of the plugs 29, and, of course, if it should become necessary for any reason to remove a roller, this may be done through the open end of the pocket 25, the cylinder 11 having been first removed.

The upper set of rollers 38 are duplicates of the rollers 28, being enclosed in pockets 35 with removable end plugs 39 identical with the parts 25 and 29 of Fig. 3 and being mounted on ball bearings 36 and 37 identical with the bearings 26 and 27 of Fig. 3. The sleeve 19 is provided with three windows to receive rollers 38, as in the case of ring 22, but the angular position of the sleeve and the upper set of rollers is different from the position of the corresponding parts in the lower set, that is to say, the rollers of the two sets are staggered, those of the upper set being displaced 60° from the corresponding rollers of the lower set. While this staggering of the rollers is not essential, it serves to spread the bearing surface over substantially the entire perimeter of the cylinder 11 and thereby accomplishes a useful purpose.

In the foregoing description I have necessarily gone somewhat into detail in order to explain fully the particular embodiment of the invention herein illustrated, but I desire it to be understood that such detailed disclosures are not to be construed as amounting to limitations except as they may be included in the appended claims.

Having thus described my invention, I claim:

1. In an air strut, a pair of telescoping cylinders, one of said cylinders formed with pockets carrying a series of rollers spaced around the periphery of the cylinder and bearing upon the other cylinder, each roller having a longitudinal surface contour corresponding to the transverse curvature of the cylinder surface upon which it bears.

2. In an air strut, a pair of telescoping cylinders, the outer one of said cylinders formed with pockets carrying a series of spool-like rollers spaced around the periphery of the cylinder and bearing upon the surface of the inner cylinder.

3. In an air strut, a pair of telescoping cylinders, two series of pockets formed in one of said cylinders, two series of rollers spaced apart lengthwise of the strut and carried in said pockets, the rollers of each series being spaced around the periphery of the cylinder upon which they are mounted and bearing upon the other cylinder, each roller having a longitudinal surface contour corresponding to the transverse curvature of the cylinder surface upon which it bears.

4. In an air strut, inner and outer telescoping cylinders, two series of pockets formed in the outer cylinder, the outer cylinder carrying two series of spool-like rollers in said pockets, said series being spaced apart longitudinally of the strut and the rollers of each series being spaced around the periphery of the cylinder and bearing upon the inner cylinder.

5. In an air strut, a pair of telescoping cylinders, two series of rollers spaced apart lengthwise of the strut, the rollers of each series being supported in pockets and spaced around the periphery of the cylinder upon which they are mounted and bearing upon the other cylinder, and the rollers of one series being staggered with respect to those of the other series, each roller having a longitudinal surface contour corresponding to the transverse curvature of the cylinder surface upon which it bears.

6. In an air strut, inner and outer telescoping cylinders, two series of pockets formed in the outer cylinder, the outer cylinder carrying two series of spool-like rollers in said pockets, said series being spaced apart longitudinally of the strut and the rollers of each series being spaced around the periphery of the cylinder and bearing upon the inner cylinder, the rollers of one series being staggered with respect to those of the other series.

7. In an air strut, a pair of telescoping cylinders, the outer cylinder carrying a series of spool-like rollers spaced around the periphery of the cylinder and bearing upon the inner cylinder, the outer cylinder having a pocket for each roller, bearings for the roller in said pocket, and a removable closure for one end of each pocket.

8. In an air strut, a pair of telescoping cylinders, the outer cylinder carrying a series of spool-like rollers spaced around the periphery of the cylinder and bearing upon the inner cylinder, the outer cylinder having a pocket for each roller, bearings for the roller in said pocket, said pocket having an end opening of sufficient size to permit the withdrawal of the roller therethrough, and a closure for said opening.

9. In an air strut, a pair of telescoping cylinders, packing carried by the outer cylinder near its inner end, a packing ring positioned outwardly of said packing, a series of spool-like rollers carried by the outer cylinder spaced around the periphery thereof and bearing on the surface of the inner cylinder, said ring being cut away at suitably located points to accommodate said rollers.

10. In an air strut, a pair of telescoping cylinders, the outer one of said cylinders carrying two series of spool-like rollers, the two series being spaced longitudinally of the strut and the rollers of each series being arranged in a transverse plane and spaced apart circumferentially at equal intervals and bearing on the inner cylinder, and packing interposed between the cylinders and between the two series of rollers.

11. In an air strut, a pair of telescoping cylinders, one of said cylinders formed with pockets carrying a series of rollers spaced around the periphery of the cylinder and bearing upon the other cylinder, each roller having a longitudinal surface contour corresponding to the transverse curvature of the cylinder surface upon which it bears, the combined lines of engagement between rollers and cylinder equaling at least 90° of arc.

LOUIS W. GREVE.